United States Patent [19]

Madsen

[11] 4,108,354

[45] Aug. 22, 1978

[54] GASEOUS MIXTURE ULTRACENTRIFUGE

[75] Inventor: Kristian Dahl Madsen, Vesteras, Sweden

[73] Assignee: ASEA Aktiebolag, Vesteras, Sweden

[21] Appl. No.: 677,062

[22] Filed: Apr. 15, 1976

Related U.S. Application Data

[63] Continuation-in-part of Ser. No. 594,738, Jul. 10, 1975, abandoned.

[30] Foreign Application Priority Data

Jul. 23, 1974 [SE] Sweden .................................. 7409554

[51] Int. Cl.² .......................................... B04B 11/06
[52] U.S. Cl. .................................. 233/30; 233/47 R
[58] Field of Search ................ 233/1 R, 1 A, 1 C, 21, 233/27, 28, 11, DIG. 1, 47 R, 30, 36, 42

[56] References Cited

U.S. PATENT DOCUMENTS

| 1,257,235 | 2/1918 | Howell | 233/28 |
| 2,947,471 | 8/1960 | Beans et al. | 233/DIG. 1 |
| 3,108,955 | 10/1963 | Boyland | 233/DIG. 1 |
| 3,216,655 | 11/1965 | Wind et al. | 233/27 |
| 3,501,091 | 3/1970 | Oyama et al. | 233/11 X |
| 3,780,937 | 12/1973 | Tahara et al. | 233/1 C |
| 3,797,737 | 3/1974 | Kadotani et al. | 233/27 |
| 3,844,730 | 10/1974 | Laussermair | 233/27 X |
| 3,847,573 | 11/1974 | Gandrud | 55/319 |
| 3,913,828 | 10/1975 | Roy | 233/27 |
| 3,955,757 | 5/1976 | Lowry | 233/DIG. 1 |
| 3,998,610 | 12/1976 | Leith | 55/17 |

FOREIGN PATENT DOCUMENTS 833,487 3/1952 Fed. Rep. of Germany .... 233/DIG. 1

Primary Examiner—George H. Krizmanich
Attorney, Agent, or Firm—Kenyon & Kenyon, Reilly, Carr & Chapin

[57] ABSTRACT

A gaseous mixture ultracentrifuge has a hollow cylindrical rotor having its ends closed by end covers through which inlet and outlet holes are formed, the rotor being internally free from non-rotative parts, while non-rotative means on the outsides of the end covers provide via the holes, for feeding the gaseous mixture into the rotor through one of the end pieces, and for removing separated components of the mixture through the outlet holes of the end covers.

5 Claims, 7 Drawing Figures

GASEOUS MIXTURE ULTRACENTRIFUGE

This application is a continuation-in-part of U.S. application Ser. No. 594,738 filed July 10, 1975, now abandoned.

BACKGROUND OF THE INVENTION

Ultracentrifuges are used for the separation of the components of gaseous mixtures when the components have specific gravities differing from each other by only a small degree.

Conventionally, an ultracentrifuge comprises a rotor formed by a hollow cylindrical wall having opposite ends provided with end covers, the rotor being operated in a vacuum because it must be rotated at speeds ranging from 30,000 to 100,000 rpm. One of the end covers has a central hole through which a non-rotative tube projects into the interior of the rotor with its inner end mounting a non-rotative array of gas inlets and outlets appropriately arranged to introduce the mixture of gaseous components and to provide outlets for the centrifugally separated components, the two containing non-rotative pipes so that outside of the rotor the gaseous mixture can be fed into the rotor and the separated components removed from the rotor.

These non-rotative parts inside of the rotor operating at its necessarily very high rotative speeds, have been found to have a tendency to vibrate, possibly at their resonance frequency, thus involving the serious risk of an accident, particularly when the rotor is accelerating or decelerating through its critical speeds. In addition, what would otherwise be natural gas flows within the rotating rotor, are made impossible or at least greatly retarded by the non-rotative or stationary parts inside of the rotor.

In other words, with the conventional construction the operation of an ultracentrifuge involves the problems of a possible centrifugally-induced rotor explosion, and impedance of the desired centrifugal separation of the gaseous components of the mixture being processed.

SUMMARY OF THE INVENTION

According to the present invention, such problems are eliminated or at least reduced greatly, because the rotor interior is entirely freed from non-rotative or stationary parts.

Instead of the conventional construction, the end covers of the hollow cylindrical wall, which parts comprise the rotor, are made so that each cover is provided with a plurality of outlet holes formed therethrough and radially spaced from the rotor's axis, while one of the covers has at least one inlet hole formed therethrough and which is more adjacent to that axis than are the outlet holes.

With this new construction, there are no internal non-rotative or stationary parts which can be subjected to harmful vibration while, at the same time, normal centrifugally-induced gas flows are free to travel unimpeded within the rotor's cylindrical wall.

The necessary non-rotative or stationary parts for flowing the mixture into and the separated components from the rotor, are entirely on the outsides of the two end covers and fed through and from the inlet and outlet holes of the end covers.

The inlet hole through the one of the end covers is preferably positioned coaxially with the rotor's axis and preferably is provided with a cylindrical baffle which extends inwardly from the inlet hole, also concentrically with the rotor's axis, and either terminates at a position spaced from the other or opposite end cover, or extends completely to and connects with this other or opposite end cover to provide a more rigidly braced, overall rotor construction; in the latter case the completely extending baffle is formed with radial openings adjacent to its axially central portion so that the introduced gaseous mixture can flow outwardly into the annular space inherently formed between the baffle and the rotor's cylindrical wall where the centrifugal separation of the gaseous components of the mixture, can acquire natural centrifugally-induced flows.

BRIEF DESCRIPTION OF THE DRAWINGS

Examples of ultracentrifuge constructions embodying the principles of the present invention are illustrated by the accompanying drawings, in which:

FIGS. 4 and 4a each show in vertical section approximately half of the internal construction of the top end cover of FIG. 3, FIG. 4 showing substantially the construction illustrated by FIG. 3, while FIG. 4a shows a possible modification; and FIGS. 5 and 5a in vertical section, respectively show possible modifications of the construction shown by FIGS. 4 and 4a.

DETAILED DESCRIPTION OF THE INVENTION

Figure 1:
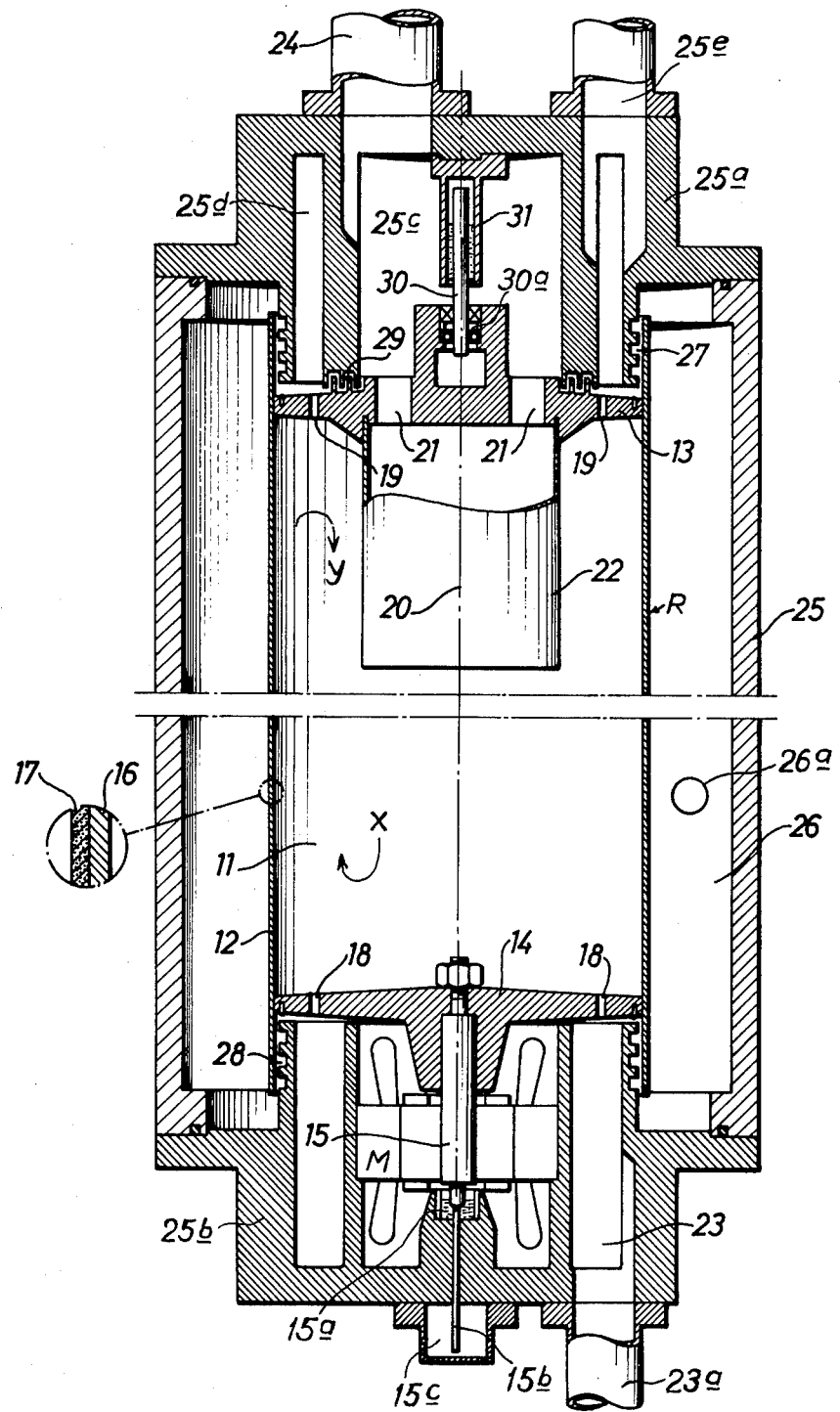
FIG. 1 in vertical section shows a first example.

Having reference to FIG. 1, the rotor R is shown as enclosing a centrifuging space 11 and formed by a hollow cylindrical wall 12 with a top end cover 13 and a bottom end cover 14, these covers forming end pieces for the rotor R and being rigidly joined to the cylindrical wall 12.

The rotor is vertically positioned with its bottom end piece 14 carried by a shaft 15 journaled by a bearing 15a of typical construction, an example of such a bearing being shown by U.S. Pat. No. 3,052,504. In this case, lubrication is by way of a wick 15b which depends from the bearing into an oil reservoir 15c. The shaft 15 is driven by a motor M which may be of the type conventionally used to drive an ultracentrifuge rotor. The bottom end cover 14 has an annular series of vertical outlet holes 18 formed through it adjacent to its periphery and the top end piece or cover 13 is also provided with generally corresponding outlet holes, all of the outlet holes 18 and 19 being positioned at a considerable or substantial distance from the rotor axis 20. The outlet holes are preferably positioned outside of one-half the radius of the end pieces which are, of course, circular. In other words, the outlet holes are located adjacent to the peripheries of the two end covers. Also, they are positioned symmetrically and concentrically about the axis 20.

The rotor's gaseous mixture inlet is formed by an annular series of holes 21 in the upper or top cover 13, these being located closer to the axis 20 than the outlet holes and inwardly with respect to the outlet holes. A cylindrical baffle 22 is fixed to the end piece 13 so as to depend into the inside of the rotor R far enough to separate the incoming flow of gaseous mixture introduced via the holes 21, from outgoing separated gaseous components flowing upwardly and through the outlet holes 19.

As usual, the lower part of the ultracentrifuge is cold and the upward part is heated, the means for doing this not being shown, the temperature differential leading to a direction of gas circulation within the rotor R substantially as indicated by the arrows X and Y. Depending on the specific gravities of the gaseous mixture components, one component is discharged through the outlet holes 19 of the top end cover 13 while the other is discharged through the outlet holes 18 in the bottom cover 14. The cylindrical or tubular baffle 22 prevents the incoming gaseous mixture entering through the holes 21, from causing disturbances insofar as concerns the circulating and exiting gaseous components. The stator or non-rotative rotor enclosure 25, which is cylindrical and concentric with respect to the rotor R, permits the maintenance of a high vacuum in the annular space 26 surrounding the rotor's cylindrical wall 12. The vacuum may be maintained via one or more exhaust openings 26a through the wall 25, and to which a suitable evacuating pump (not shown) may be connected.

The cylindrical wall of the stator 25 is provided with a top end piece 25a and a bottom end piece 25b, the top end piece forming a non-rotative or stationary manifold space 25c with which the gaseous mixture inlet pipe 24 connects and through which the gaseous mixture is distributed to the inlet holes 21 of the top rotor end piece 13. This top stator end piece 25a also forms an annular manifold space 25d which connects with a gaseous component outlet 25e and which opens above the outlet holes 19.

The bottom end piece 25b not only serves to mount the motor M and the bearing 15a, but in addition forms an inlet manifold 23 connecting with a gaseous component outlet pipe 23a, the manifold being annular and opening to the holes 18 of the rotor's bottom end piece 14. A labyrinth seal 29 separates spaces 25c and 25d while projecting ends of the rotor's cylindrical wall 12 is provided at the top with a seal 27 and at the bottom with a seal 28, for sealing with respect to the top and bottom end pieces of the stator 25. The seals 27 and 28 may be of the trapezoidal thread seal type.

As shown on an enlarged scale by FIG. 1, the cylindrical wall 12 of the rotor R may have a metal frame 16, normally of aluminum or aluminum alloy clad with a polyester impregnated carbon-fiber layer 17. As another detail, the rotor R is centered on the axis 20 by an upper bearing formed by a small diameter vertical shaft held in damping sleeve 31 of rubber or the like, and with its lower end holding the top end piece 13 of the rotor R, by way of an anti-friction bearing 30a.

It can be seen that the interior of the rotor R is entirely free from non-rotative or stationary parts. All of the non-rotative parts are on the outside of the rotor R. The construction disclosed is suitable for rotor speeds in the area of 40,000 rpm or higher.

Figure 2:
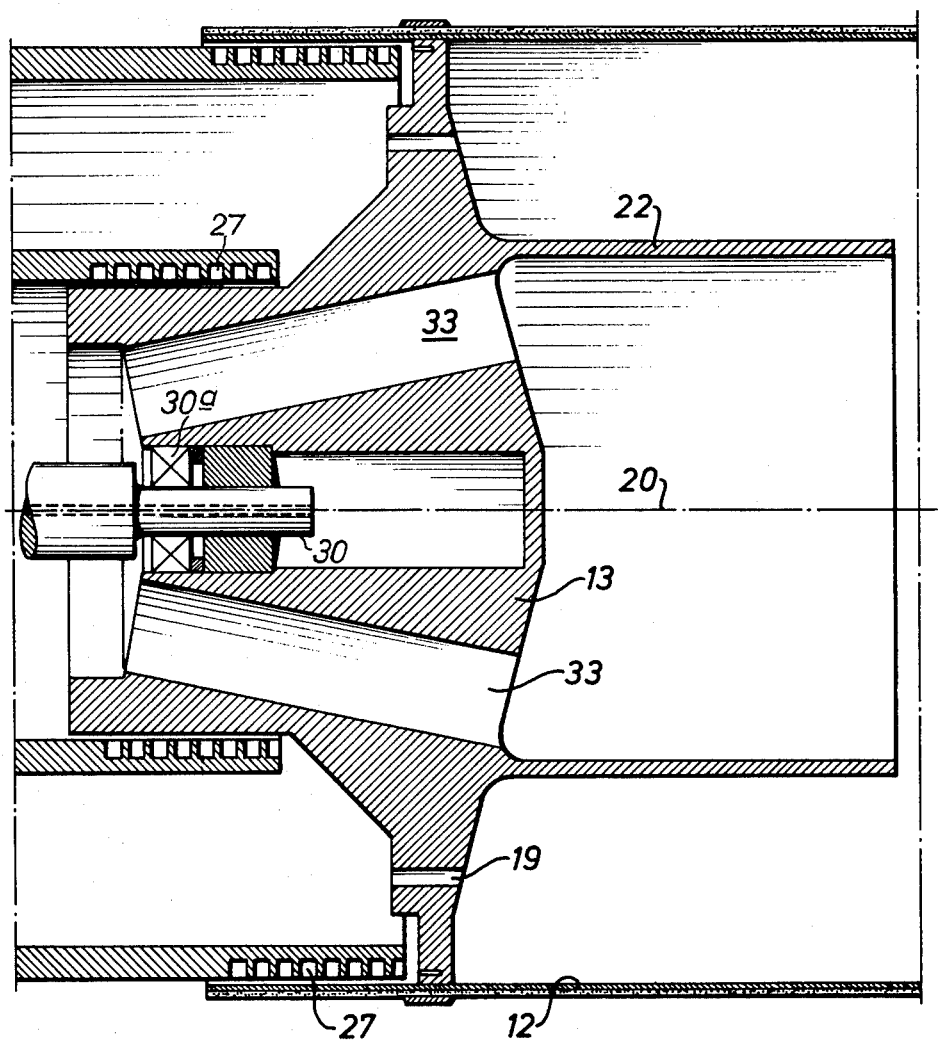
FIG. 2 in vertical section shows a modification of one of the end covers shown in FIG. 1.

In FIG. 2, the upper end piece 13 is shown as being vertically thickened and as having diverging inlet passages 33; also trapezoidal seals 27 are shown at all points.

Figure 3:
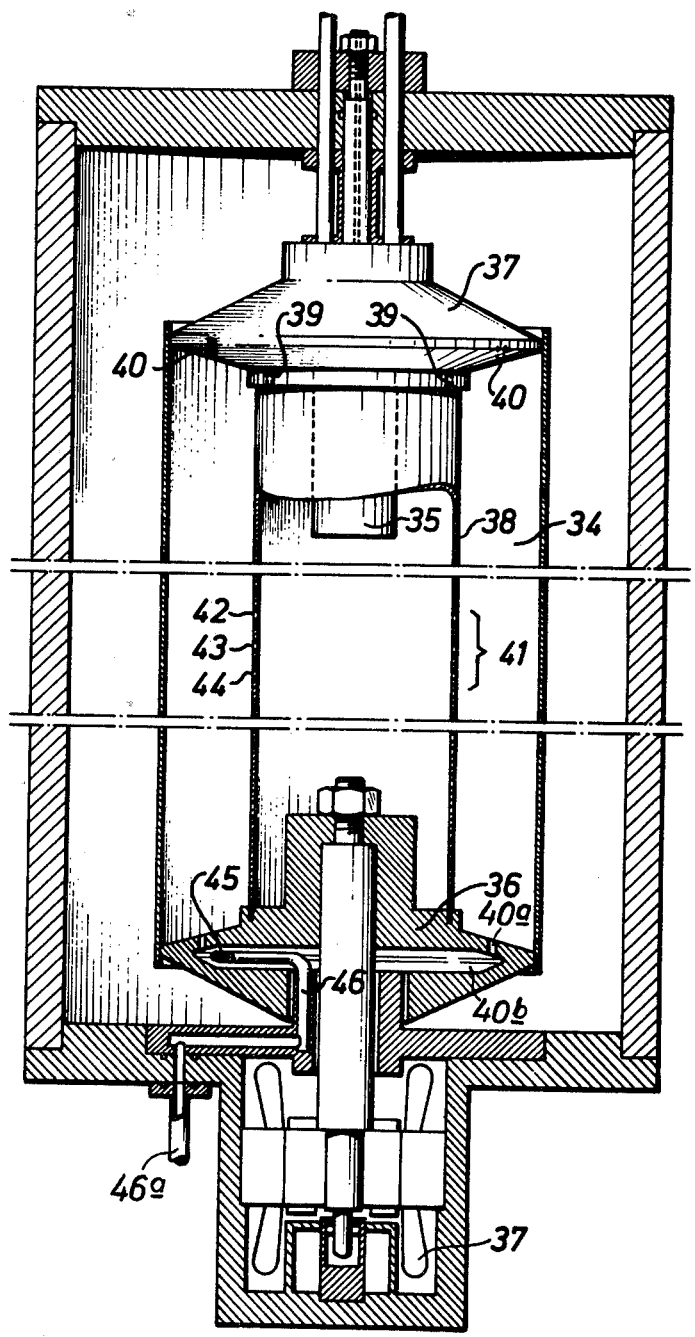
FIG. 3 in vertical section provides a second example, the rotor's top end cover being here shown in elevation.

In FIG. 3 a second example of the new construction is shown. In this case the rotor 34 has a gaseous mixture inlet hole 39, the top and bottom rotor end pieces being shown at 36 and 37. Further, in this case the cylindrical baffle is shown at 38 as being extended the complete axial length of the rotor 34 and as being joined with the bottom end piece or cover 36 of the rotor 34. Centrally between the ends of this cylindrical baffle 38 or tubular connection between the top and bottom end pieces, a series of annular holes 42, 43, and 44 are shown as embracing the referred-to area, indicated by the bracket 41. Holes 40 in the end piece 37 open from the annular space formed between the cylindrical baffle and the cylindrical wall of the rotor 34, and holes 40a in the bottom end piece 36 and opening from the annular space described, complete the two gaseous component outlets required at the top and bottom of the rotor.

Figure 4A:
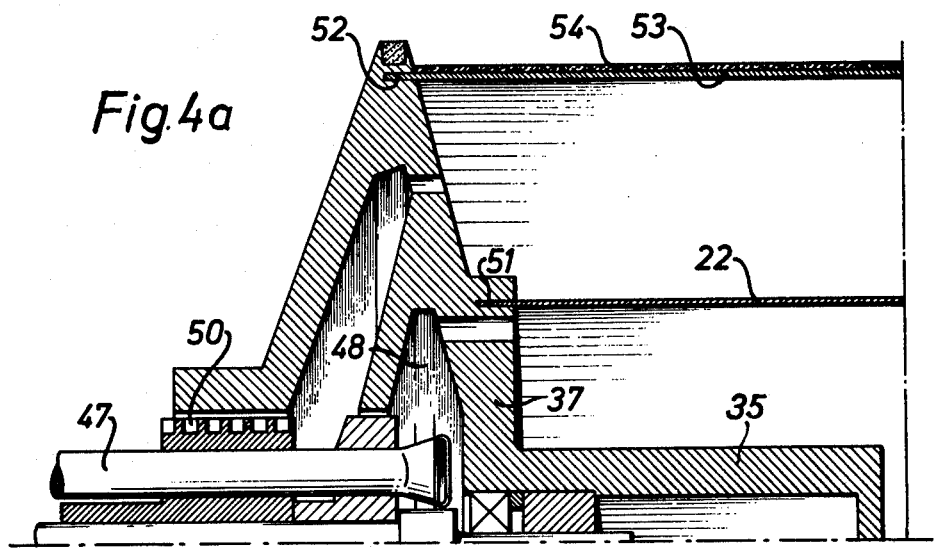
Figure 4:
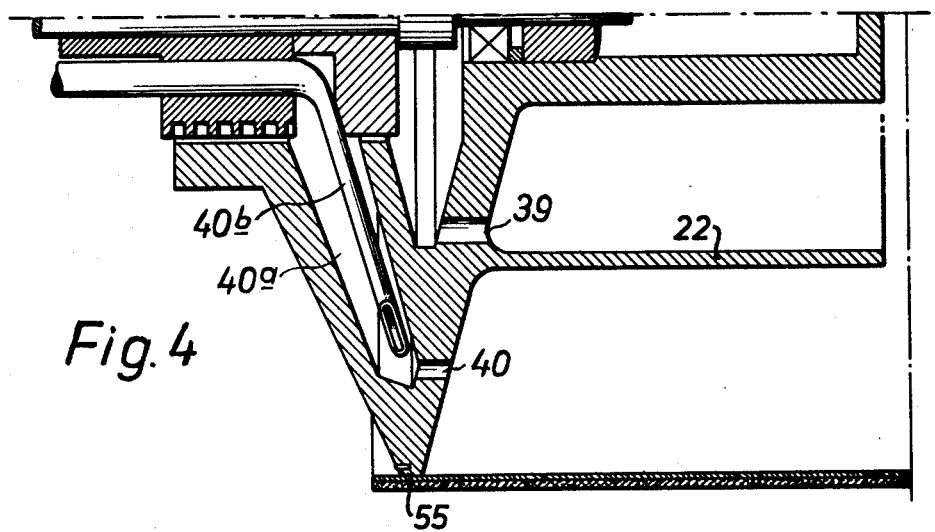

The bottom end piece 40a forms a manifold or collecting chamber 40b which is, of course, rotative, a stationary tube having a horizontal portion 46 with a tangentially opening end in this chamber 40b and into which the separated gas component received by the bottom end piece of the rotor, is forced, a vertical extension 46 of this tube going on downwardly and ultimately connecting with a discharge pipe 46a. FIGS. 4 and 4a show the upper rotor end piece or cover of FIG. 3 in the form of two possible embodiments with the two views when taken together showing the general construction of that upper end piece or rotor cover 37. This shows that the part 35, seen in FIG. 3, is a bearing housing for the upper pin shaft 30 seen in FIG. 1. The gaseous mixture inlet openings 39 are formed around this bearing housing 35 inside of the tubular baffle 22 and are fed with the introduced gaseous mixture by way of a pipe 47 opening into a manifold space 40a. The outlet holes 40 in this top end piece, open into a manifold space 40a for pick-up by an exhaust tube 40b which generally corresponds in its principle of operation to the parts 45 and 46 shown in FIG. 3. A trapezoidal thread seal 50 seals the rotative end piece manifold 40a, relative to the stationary or static parts 47, 40b, etc.

In FIG. 4a the baffle or tubular part 22 is shown as fixed to the end piece by having its end edge portion inserted in a slot 51 formed in the end piece 37, whereas in FIG. 4 this part 22 is shown as being in an integral part of the end piece 37. In FIG. 4a the cylindrical wall formed of the inner and outer layers 53 and 54 previously described as being 16 and 17 in FIG. 1, the metal layer 53 being shown as being inserted in a machine slot 52 in the end piece 37, whereas in FIG. 4 the cylindrical rotor wall is shown as being welded or soldered at 55 to the end piece or cover of the rotor.

Figure 5:
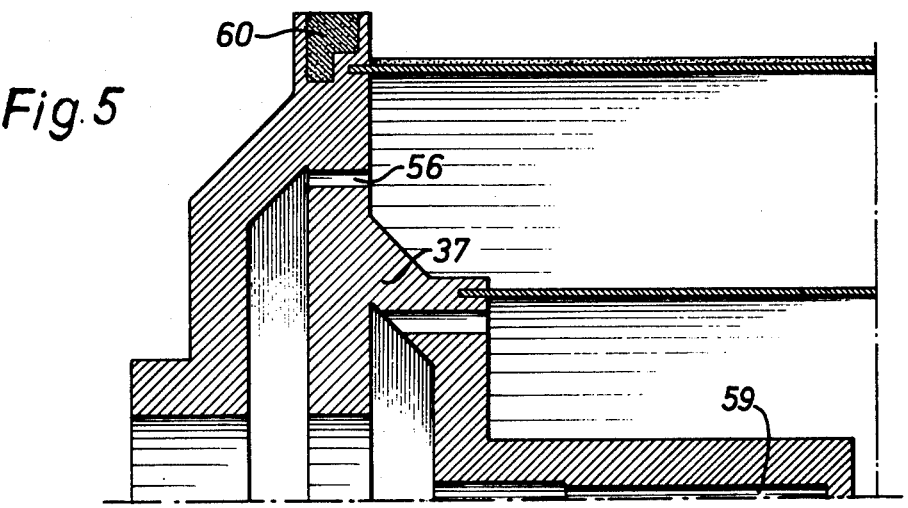
Figure 5A:
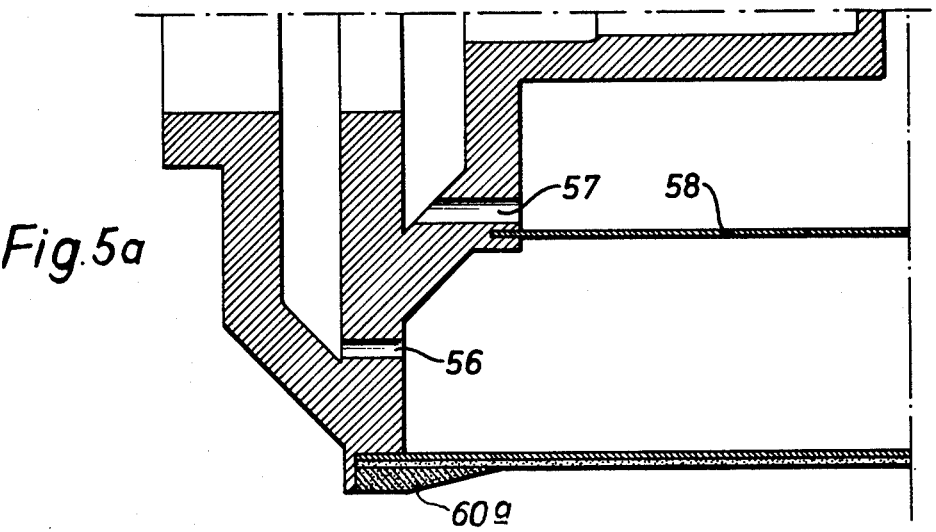

Another example of the upper end piece is shown by FIGS. 5 and 5a where the gas outlets 56 and gas inlets 57 are separated by means of an aluminum tube 58 attached in a slot formed in the end piece. The upper bearing housing is shown at 59 and a fiber bandaging for the periphery of the end piece is shown at 60 in FIG. 5. A different mode for applying the fiber bandaging is shown at 60a in FIG. 5a.

The foregoing constructional variations are provided to show possible modifications of the constructions shown by FIG. 1 and 3, using FIGS. 4 and 4a as required to complete the disclosure of the construction of FIG. 3.

What is claimed is:

1. A gaseous mixture ultracentrifuge comprising a rotatively mounted rotor formed by a hollow cylindrical wall having opposite ends provided with end covers, said rotor having an axis about which the rotor rotates, each of said covers having a plurality of outlet holes formed therethrough and radially spaced from said axis, one of said covers having at least one inlet hole formed therethrough and which is radially spaced from said axis but more adjacent to said axis than are said outlet holes, said rotor having an inside free from non-rotative parts and said covers completely enclosing said inside excepting for said holes, means for rotating said rotor, feeding means for feeding a gaseous mixture to said inlet hole, and collecting means for collecting separated components of the mixture from said outlet holes, said rotor having solid shafts extending on said axis away from said end covers and bearings in which said shafts are rotatively mounted, said feeding and collecting means being non-rotative and spaced radially from said axis and free from said shafts.

2. The ultracentrifuge of claim 1 in which a cylindrical baffle is fixed concentrically to the one end cover having said inlet hole, said baffle surrounding said hold and extending from that one end cover towards the other of said covers and separating the inlet and outlet holes of that one end piece.

3. The ultracentrifuge of claim 2 in which said baffle has a length at least equal to its diameter and terminates at a position between said end pieces.

4. The ultracentrifuge of claim 2 in which the said cylindrical baffle extends completely between and joins with both of said end covers, the baffle having radial holes opening into the rotor's interior on the outside of the baffle, said holes being positioned adjacent to an axially central portion of said baffle.

5. The ultracentrifuge of claim 1 in which at least one of said end pieces has a peripheral bandage made of fibrous material.

* * * * *